UNITED STATES PATENT OFFICE.

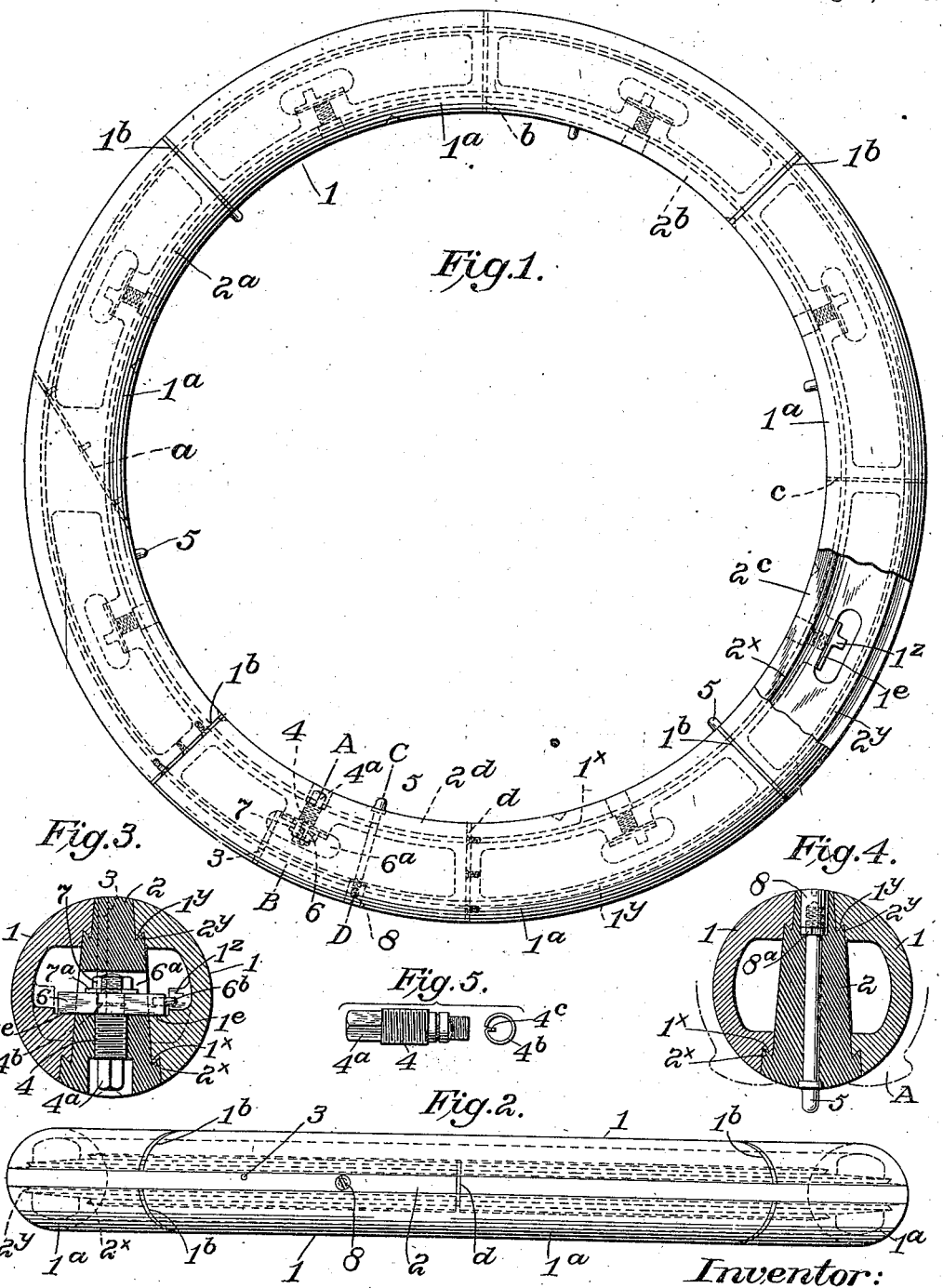
W. R. DENMAN.
SEPARABLE CORE.
APPLICATION FILED MAR. 20, 1916.
1,192,874.
Patented Aug. 1, 1916.

WALTER R. DENMAN, OF AKRON, OHIO.

SEPARABLE CORE.

1,192,874.  Specification of Letters Patent.  Patented Aug. 1, 1916.

Application filed March 20, 1916. Serial No. 85,470.

*To all whom it may concern:*

Be it known that I, WALTER R. DENMAN, a citizen of the United States, residing at Akron, Ohio, have invented certain new and useful Improvements in Separable Cores, of which the following is a specification.

My present invention relates to improvements in collapsible or separable cores designed for use in the manufacture of outer shoes or cases of pneumatic tires.

One of the objects of the invention is to provide a construction which shall be free from all small loose parts, such as screws or bolts and nuts, washers, etc., likely to be misplaced when the core is removed from the tire.

Another object is to devise a core of this character which may be more quickly assembled or taken apart than cores as heretofore constructed, so far as I am aware.

A further object is to so proportion the separable parts that they may be readily removed from between the beads of the complete tire without spreading them apart to any material extent.

I have also aimed to provide a core of minimum weight, and withal strong, durable and efficient in use.

The invention includes the novel features of construction and arrangement and combination of parts hereinafter described and particularly defined by the appended claims, an embodiment of the invention being illustrated in the accompanying drawings in which—

Figure 1 is a side view. Fig. 2 is an edge view. Fig. 3 a section on line A—B of Fig. 1. Fig. 4 a section on line C—D of Fig. 1. Fig. 5 is a view of details.

The core, as shown in these drawings, comprises three main sections, to wit, two side rings 1, 1, and an intermediate ring 2.

Each of the rings 1 is divided up into a plurality of sections (four being shown in the drawings) designated $1^a$, the divisions being conveniently formed on lines radial of the core, as indicated at $1^b$.

The intermediate ring 2 is likewise divided up into a plurality of sections, four being shown in the drawings designated $2^a$, $2^b$, $2^c$ and $2^d$. The lines of severance between most of these sections may be radial, as indicated at $b$, $c$, and $d$ respectively, but the line of severance between two of the sections is made non-radial, as indicated at $a$, to allow one of the sections $2^a$ to be removed first, whereby the other sections may be removed successively. The sections of the inner ring 2 are arranged to break joints with the sections of the outer ring, as indicated by the relative full and dotted lines in Fig. 1.

The central ring is provided with annular inner shoulders $2^x$ and outer shoulders $2^y$, which are adapted to engage correspondingly inclined or wedge shaped shoulders $1^x$ and $1^y$ on the side sections 1. In order to draw the sections firmly together in the position shown in Fig. 3 and hold them in locked engagement, the side sections 1 are recessed, as shown, to receive the ends of a clamping bar 6, which are located in recesses $6^a$ in the ring section 2. The clamping bar is carried on the inner end of a screw 4 threaded through a suitable opening extending radially of the ring 1 and having one end $4^a$ square for the reception of a suitable operating wrench, said head being preferably countersunk in its corresponding ring section as shown.

Each clamp 6 is rotatably mounted upon its corresponding bolt 4, being held thereon by a suitable lock nut 7 and washer $7^a$. As before stated, the clamps 6 are rotatably mounted on bolts 4 but friction means are provided by which, when the bolts 4 are rotated, the clamps tend to rotate therewith until arrested by some positive stop. Such means may take the form of an annular expansion spring $4^b$ resting in an annular groove in the bolt or screw 4 and having an inturned end $4^c$ engaging an opening in the screws bolt. When the core sections are assembled and ready to be drawn tightly together the clamping bars occupy the position shown in Fig. 3, extending transversely of the inner ring 2 and into the recesses in the side sections 1 overlapping the shoulders $1^e$ thereon. The rotation of screw 4 in the proper direction draws the clamp bar down against the shoulder $1^e$, thus tends to draw the central section 2 and the side sections 1 in opposite directions, causing the inclined or beveled surfaces $1^y$ and $2^y$ to be brought together with a wedging action, thus clamping the intermediate and side sections firmly together. The rotation of the clamping bar beyond a position at right angles to the plane of the core, such as illustrated in Fig. 110

3, is prevented by a stop member, such as a pin 6$^b$ abutting against a shoulder 1$^z$ on one of the side sections.

When the core is within the tire, which tire is indicated by the dotted lines at A, and the core is to be removed from the finished tire, the bolt 4 is rotated in a reverse direction. The first tendency of this is to raise the clamping bar from its seat and as soon as it is raised sufficiently so that there is no friction between its ends and the shoulders 1$^e$ the frictional engagement with the bolt or screw, caused by the friction spring causes the clamping bar to be swung into a position longitudinally of the core and wholly within the recesses in the central section 2. In the operation of removing the core the clamping bar in the section 2$^a$ of the ring 2, would first be swung into such unlocking positions, allowing this section to be removed by reason of its non-radial abutting face and thereafter the sections 2$^b$, 2$^c$ and 2$^d$ may be similarly unlocked and removed. These sections being very narrow, in comparison with the total width of the core, may be removed without material spreading of the beaded edges of the tire. Thereafter the side sections may be moved laterally to bring them successively into the space formerly occupied by the sections of the ring 1 and they may be successively removed in any order.

Pins 3 are provided in the sections of ring 2 to limit the reverse movement of the clamping bars so as to cause them to be stopped in the proper lengthwise position to permit the removal of the said sections of ring 2.

This core is designed to be supported during the building of the tire upon a chuck having radially movable sustaining arms, and to provide means for the engagement of such arms I preferably provide pins 5 which are inserted in radial openings in the sections of ring 2 and are clamped therein by nuts 8 screwed onto the bolt and bearing against spring washers 8$^a$, the nuts lying in recesses in the outer periphery of the ring 2 and having their outer faces flush with the surface thereof and provided with a kerf by which they may be operated by a screw driver. It will be understood, however, that the pins remain in the ring sections 2 at all times except when they are to be removed and replaced by reason of wear, or breakage.

A core embodying my invention, as above illustrated and described, can be made of extreme lightness, as by using a strong central steel ring for holding the chuck engaging pins and locking parts which receive the strain and wear, I am enabled to make the side rings of aluminum and also of hollow form, as shown, without detracting from the strength and durability.

Having thus described my invention what I claim is:—

1. A separable core comprising a central and two side rings, each of said rings composed of a plurality of sections, with the sections of the intermediate ring breaking joints with those of the side rings and means carried by the central ring for clamping the side rings and central rings together.

2. A separable core comprising intermediate and side rings divided into sections, with the sections of the intermediate rings breaking joints with those of the side rings, said intermediate and side rings having inclined engaging faces and means carried by the intermediate ring for holding said inclined engaging faces in engaging relation.

3. A separable core comprising intermediate and side sectional rings having interengaging flanges, clamping means carried by the sections of the intermediate ring adapted to be moved into and out of locking engagement with the side rings and means carried by the sections of the intermediate ring for operating said clamping means.

4. A separable core comprising intermediate and side sectional rings having interengaging flanges, rotatable clamping bars mounted in recesses in the sections of the inner ring and adapted to be swung into and out of locking position with relation to the sections of the side rings and means operable from the inner faces of the sections of the intermediate ring for swinging said clamping bars.

5. A separable core comprising intermediate and side sectional rings, clamping bars movably mounted in recesses in the intermediate ring and having their ends adapted to be projected into recesses in the side rings and means operable from the inner periphery of the core, moving said clamping bars into and out of the recesses of the side rings.

6. A separable core comprising an intermediate and side rings having interengaging shoulders or flanges, locking bars rotatably mounted in recesses in the sections of the intermediate ring and adapted to be swung into positions in the plane of the core and also into positions at right angles to the plane of the core with their ends projected into recesses in the side rings, radially disposed screw members carried by the intermediate ring and connected with the clamping bars and adapted to move them radially of the core and also to swing them on their axes and means for limiting the swinging movement of the clamping bars.

7. A separable core comprising intermediate and side sectional rings having interchanging flanges, clamping bars mounted in recesses in the sections of the intermediate ring and having ends adapted to swing into overlapping relation with shoulders on the side ring sections, screw threaded into said intermediate sections and having portions frictionally engaging with said clamping bars and stops for limiting the swinging movement of said clamping bars.

8. A separable core comprising intermediate and side sectional rings, clamping bars located in openings in said intermediate ring and having ends adapted to be swung into locking engagement with shoulders on the side rings, radially disposed screw bolts threaded through the inner portions of the sections of the intermediate ring and having unthreaded portions passing through openings in the clamping bars, means for holding clamping bars on said unthreaded portions, friction means interposed between said screw bolts and the clamping bars and stops for limiting the swinging movement of said clamping bars.

9. A core of the character described having radial openings therethrough, pins inserted in said openings and having chuck arm engaging heads and nuts engaging the outer ends of the pins and counter-sunk in the outer periphery of the core.

10. A separable core comprising an intermediate and side sectional rings, chuck engaging means carried by the intermediate ring, locking devices for holding said rings together also carried by the intermediate ring, said intermediate ring being of steel and said side rings being of lighter material.

In testimony whereof, I affix my signature.

WALTER R. DENMAN.

Witnesses:
C. A. WOLF,
M. D. MASKREY.